Patented Feb. 15, 1927.

1,618,004

UNITED STATES PATENT OFFICE.

LUCIEN H. GREATHOUSE, OF JAMAICA, NEW YORK, ASSIGNOR OF ONE-THIRD TO CHARLES H. KEEL, OF NEW YORK, N. Y.

CATALYST FOR AMMONIA SYNTHESIS.

No Drawing.    Application filed March 31, 1922.    Serial No. 548,541.

My invention relates to the art of production of ammonia by the ammonia synthesis process.

The catalyst most generally used commercially in the ammonia synthesis is some material composed largely of metallic iron and it may be obtained according to several known different methods. The effectiveness and efficiency, however, of the catalyst in the synthesis process depend to a great degree upon the method employed in its preparation. For example, it is known that solid catalysts containing one or more chemical elements in the uncombined condition, particularly those of metallic character, with or without other additions, have catalytic properties of unique effectiveness, if prepared from compounds, such as the oxide of the free elements ultimately desired, which compounds have been previously brought to the fused or liquid state, then allowed to solidify, and thereafter are brought to the elemental condition by chemical reactions of reduction, the latter proceeding at temperatures below either those required for the fusion of the compounds (or mixture of compounds existing in the unreduced composition), or required for fusion of the reduced products (U. S. Patent No. 1,225,755, Bosch and Mittasch). The physical structure and condition of the catalyst probably have a decided controlling effect upon the synthesis process.

The methods heretofore employed in the production of the catalyst are not only costly and tedious but usually result in compositions of uncertain character, both as to purity and physical structure. For example, the fusion of the mass, according to the prior methods of burning metallic iron with oxygen, treating with the gas blast torch or heating otherwise by the application of energy externally, is only incompletely effected or at most with great difficulty and the fused mass thus obtained later reduced results in a catalyst of irregular and non-uniform composition.

By my invention I am enabled to obtain a catalyst of improved character for use in the ammonia synthesis, particularly in that it possesses higher purity and greater homogeneity and uniformity in its structure than has often been obtainable heretofore. Moreover, I employ methods in preparing and treating the catalyst requiring little attention and enabling the character and composition of the catalyst to be predetermined and controlled with an accuracy unattainable with prior methods with which I am familiar. The method employed by me is accompanied by a minimum of energy losses and otherwise results in the economical production of catalysts and synthetic ammonia.

According to my invention generally stated, I produce ammonia synthetically by passing a mixture of nitrogen and hydrogen over a catalyst consisting of metallic bodies obtained by the reduction of fused materials which were brought to a state of fusion altogether or substantially so by heat energy exothermically generated by chemical reactions between components of a definite charge of catalytic materials originally mixed. The materials used in the original mixture are compounds (having the free elements ultimately desired in the ammonia synthesis) of a metal, generally a metal whose oxide is reducible by hydrogen, such as $Fe_2O_3$ or $MnO_2$, and a metal such as aluminum. These materials are mixed in the required proportions so that once a reaction or combination of the free or reduced element with the component associated with the metal of the oxide, is initiated or started locally at some point in the charge, the heat generated exothermically thereafter is sufficient to continue the reaction until the fusion is complete throughout the mass. The materials are first crushed and then thoroughly mixed in a suitable crucible, the proportion of the metal or free element preferably being just sufficient to combine with a portion of the element (as oxygen) of the oxide and evolve the required heat energy to melt the charge and preferably without reducing any substantial quantity of the oxide to metallic iron. Other minor constituents may be added to the charge before known, such as alkali or alkaline earth metallic oxides, as CaO, MgO, K$_2$O, etc. These latter materials tend to render the mass or charge more fluid or more readily fusible. The crucible in which the fusion takes place should be composed of or lined with one of the constituents of the charge and preferably one of the major constituents in order to avoid variations in composition which might take place from disintegration of the crucible walls. The crucible may be a solid mass of the catalyst material with a pocket in it for reception of the charge. The reaction may be initiated by the external application of heat locally at a point of the charge, as by a special ignition composition, by a gas torch or by an electric arc. The reaction once started continues and the heat energy exothermically generated in the chemical reaction is sufficient to completely fuse the charge, the complete fusion being effected in a very short time without further attention after the reaction is once initiated. The fused mass may be poured out on a flat metallic plate to facilitate crushing and preparing for the subsequent reduction. This reduction may take place in the catalyst chamber or otherwise, as desired. The catalyst being thus prepared from a definite predetermined charge of materials desired and in the manner indicated can be obtained of the exact composition and character best adapted to the efficient synthetic production of ammonia, and such a catalyst possesses a purity, uniformity and homogeneity in chemical combination and physical structure hitherto unknown to me. The economy in the production is particularly marked both as to labor and attention required and as to conservation of energy. The exothermic reaction in fusing the original charge proceeds rapidly to all parts of the mass, before any substantial separation of the constituents by sublimation, distillation, or similar process can occur. The synthetic production of ammonia is accelerated and facilitated by my improved catalyst.

I claim:

1. In the synthetic production of ammonia, the employment of a catalyst consisting of metallic bodies obtained by the subsequent reduction of fused oxides of catalytic materials which were brought to a state of fusion by heat energy exothermically generated by chemical reactions between components of a definite charge of materials originally mixed in the preparation of the charge.

2. In the synthetic production of ammonia, the employment of a catalyst obtained by reduction of a fused mixture which was prepared by mixing a definite charge of a metallic oxide which is reducible by hydrogen with a metallic element which upon chemical reaction with the oxygen of the oxide causes the evolution of heat energy in substantial quantities and then fusing the charge by heat energy exothermically generated by chemical reactions within the charge.

3. In the synthetic production of ammonia, the employment of a catalyst obtained by reduction of a fused mixture which was prepared by mixing a definite charge of ferric oxide with a suitable quantity of a metallic element which upon chemical reaction with oxygen of the oxide causes the evolution of heat energy in substantial quantities and initiating the reaction between these components and thereby fusing the mixture by heat energy exothermically generated.

4. In the synthetic production of ammonia, the employment of a catalyst which was prepared by first adding to a definite charge of a metallic oxide mixture a metallic element which is capable of chemical reaction with the oxygen of the oxide to evolve heat energy, and in quantities sufficient to thoroughly fuse the mass by heat energy exothermically generated without substantial reduction of the oxide to the metallic state and then initiating the reaction in the charge and subsequently reducing the resultant fused product.

5. In the synthetic production of ammonia, the employment of a catalyst obtained by adding to a charge containing a metallic oxide a metallic element which is capable of chemical reaction therewith to evolve heat energy exothermically and then initiating the reaction, the metallic element being added in sufficient quantity to effect fusion in part by heat energy exothermically generated, and subsequently reducing the resultant fused product.

6. A catalyist consisting of a definite charge of a metallic oxide mixture brought to the state of fusion and partially reduced by first adding to the oxide mixture a metallic element which is capable of chemical reaction with the oxygen of the oxide to evolve heat energy and in quantity just sufficient to thoroughly fuse the mass by heat energy exothermically generated without substantial reduction of the oxide to the metallic state and then initiating the reaction, and subsequently reducing the resultant fused product.

7. A catalyst consisting of a definite charge of an iron oxide mixture brought to the state of fusion by first adding to the mixture a metallic free element which is capable of chemical reaction with the oxygen of the iron compound to evolve heat energy and in quantity just sufficient to thoroughly fuse the mass by heat energy exothermically generated without substantial reduction of the iron compound to the metallic state, and then initiating the reaction, and subsequently reducing the resultant fused product.

8. The method of producing a catalyst which consists in mixing a metallic oxide charge with a definite proportion of a metallic element which is just sufficient upon chemical reaction with oxygen of the oxide to cause the evolution of sufficient energy exothermically to fuse the mixture without substantial reduction of the oxide to the metallic state, and then initiating the chemical reaction by the application of heat to a point of the charge, and subsequently reducing the resultant fused product.

In testimony whereof, I have signed my name to this specification.

LUCIEN H. GREATHOUSE.